(12) United States Patent
Dhirde et al.

(10) Patent No.: US 12,031,058 B2
(45) Date of Patent: Jul. 9, 2024

(54) CORROSION INHIBITION COMPOSITIONS AND ASSOCIATED METHODS FOR INHIBITING CORROSION ON METALLIC SUBSTRATES

(71) Applicant: The Boeing Company, Chicago, IL (US)

(72) Inventors: Priyanka G. Dhirde, Bangalore (IN); Waynie M. Schuette, Troy, IL (US); Murali Krishna Panchangam, Bangalore (IN)

(73) Assignee: The Boeing Company, Arlington, VA (US)

( * ) Notice: Subject to any disclaimer, the term of this patent is extended or adjusted under 35 U.S.C. 154(b) by 545 days.

(21) Appl. No.: 17/366,242

(22) Filed: Jul. 2, 2021

(65) Prior Publication Data
US 2023/0052367 A1 Feb. 16, 2023

(51) Int. Cl.
| | | |
|---|---|---|
| *C09D 5/08* | (2006.01) | |
| *C08K 5/405* | (2006.01) | |
| *C09D 187/00* | (2006.01) | |
| *C23F 11/16* | (2006.01) | |

(52) U.S. Cl.
CPC ............ *C09D 5/08* (2013.01); *C08K 5/405* (2013.01); *C09D 187/00* (2013.01); *C23F 11/16* (2013.01)

(58) Field of Classification Search
CPC ........ C08K 5/405; C09D 5/08; C09D 187/00; C23F 11/16; C23F 11/146; C23F 11/148; C23F 11/149; C23F 11/162
See application file for complete search history.

(56) References Cited

U.S. PATENT DOCUMENTS

| | | |
|---|---|---|
| 7,244,793 B2 | 7/2007 | Liu et al. |
| 7,407,711 B2 | 8/2008 | Phelps et al. |
| 2020/0369951 A1 | 11/2020 | Quraishi et al. |

FOREIGN PATENT DOCUMENTS

| | | | | |
|---|---|---|---|---|
| CN | 103924249 A | * | 7/2014 | ............... C23G 1/06 |
| CN | 104 831 286 | | 8/2015 | |
| CN | 104831286 A | * | 8/2015 | ............... C23F 11/16 |
| CN | 109852173 A | * | 6/2019 | ........... C09D 133/04 |
| CN | 111020597 A | * | 4/2020 | ............... C23F 11/10 |
| CN | 111363532 A | * | 7/2020 | ............... C09K 8/54 |
| CN | 111944340 A | * | 11/2020 | ............... C09D 4/02 |
| CN | 112795928 A | * | 5/2021 | ............. C23G 1/061 |
| JP | 2017193774 A | * | 10/2017 | ............... C23G 1/06 |

OTHER PUBLICATIONS

Xu et al "Experimental and theoretical evaluation of two pyridinecarboxaldehyde thiosemicarbazone compounds as corrosion inhibitors for mild steel in hydrochloric acid solution", Corrosion Science 78, 260-268. (Year: 2014).*
Safak et al "Schiff bases as corrosion inhibitor for aluminium in HCl solution", Corroson Science 54, 251-259. (Year: 2012).*
European Patent Office, Extended European Search Report, App. No. 22177679.2 (Nov. 17, 2022).
Namachivayam et al.: "Improved Copper Corrosion Resistance of Epoxy-Functionalized Hybrid Sol-Gel Monolayers by Thiosemicarbazide," Ionics, vol. 21, No. 5, pp. 1477-1488 (Oct. 10, 2014).
Poorjary et al: "4-Hydroxyl-N'-[(3-Hydroxy-4-Methoxyphenyl) Methylidene] Benzohydrazide] as Corrosion Inhibitor for Carbon Steel in Dilute H2SO4," Journal of Failure Analysis and Prevention, vol. 21, No. 4, pp. 1264-1273 (Jun. 2, 2021).
Aytac et al.: "Experimental and Theoretical Study of the Inhibition Effects of Some Schiff Bases as Corrosion Inhibitors of Aluminum in HC1," Materials and Corrosion, vol. 63, No. 8, pp. 729-734 (Aug. 1, 2012).
Kooliyat et al: "Synthesis, Cyclic Voltametric, Electrochemical, and Gravimetric Corrosion Inhibition Investigations of Schiff Base Derived from 5,5-Dimethyl-1,3-cyclohexanedione and 2-Aminophenol on Mild Steel in 1 M HCl and 0.5 M H2SO4," *International Journal of Electrochemistry*, vol. 2019, Article ID 1094148, 13 pages (2019).
Jamil et al: "Experimental and Theoretical studies of Schiff Bases as corrosion inhibitors," *Chemistry Central Journal* (2018).
Xhanari et al: "Organic corrosion inhibitors for aluminum and its alloys in chloride and alkaline solutions: A review," *Arabian Journal of Chemistry*, vol. 12, pp. 4646-4663 (2016).

* cited by examiner

*Primary Examiner* — Anthony J Green
(74) *Attorney, Agent, or Firm* — Walters & Wasylyna LLC (57) ABSTRACT

A corrosion inhibition composition includes a carrier and a Schiff base in admixture with the carrier. The carrier includes at least one of water, a hydrocarbon solvent, and a binder.

20 Claims, 3 Drawing Sheets

CORROSION INHIBITION COMPOSITIONS AND ASSOCIATED METHODS FOR INHIBITING CORROSION ON METALLIC SUBSTRATES

FIELD

The present disclosure generally relates to corrosion inhibition and, more particularly, to organic corrosion inhibition compositions for use on metallic substrates, such as aluminum and its alloys.

BACKGROUND

Aluminum and aluminum alloys are commonly used in aerospace applications. One drawback to aluminum and aluminum alloys is their susceptibility to corrosion in various environments, especially in chloride-containing environments. Current techniques for preventing corrosion on aluminum and aluminum alloys employ hexavalent chromium and, therefore, are subject to many safety and compliance restrictions.

Accordingly, those skilled in the art continue with research and development efforts in the field of organic corrosion inhibitors for aluminum and aluminum alloys.

SUMMARY

Disclosed is a corrosion inhibition composition.

In one example, the corrosion inhibition composition includes a carrier and a Schiff base in admixture with the carrier, the carrier includes at least one of water, a hydrocarbon solvent, and a binder.

In another example, the corrosion inhibition composition includes a Schiff base. The Schiff base includes a thiosemicarbazone.

Also disclosed is a method for inhibiting corrosion on a metallic substrate.

In one example, the method includes applying to the metallic substrate a corrosion inhibition composition including a Schiff base.

Other examples of the disclosed will become apparent from the following detailed description, the accompanying drawings, and the appended claims.

DETAILED DESCRIPTION

Organic corrosion inhibitors are desirable because of their environmentally-friendly material properties and for the safety of those exposed. Further, organic corrosion inhibitors are relatively easy to synthesize thus are advantageous for processing. Dispersion of organic corrosion inhibitors in a polymer/coating composition enhances the corrosion inhibition of aluminum and aluminum alloys. The compositions can be applied easily using existing methods, including immersion, spray, brushing, and the like.

High strength aluminum alloys, such as those used in the aerospace industry, are prone to corrosion due to the intermetallics present. Therefore, the primary purpose of coating aluminum alloys with coatings containing corrosion inhibitors is for corrosion protection. Coating aluminum and aluminum alloys with organic corrosion inhibitors is ideal for manufacturing because it is relatively low cost, lightweight, and utilizes environmentally benign materials. Curing may be achieved by air drying or thermal curing.

Figure 1:
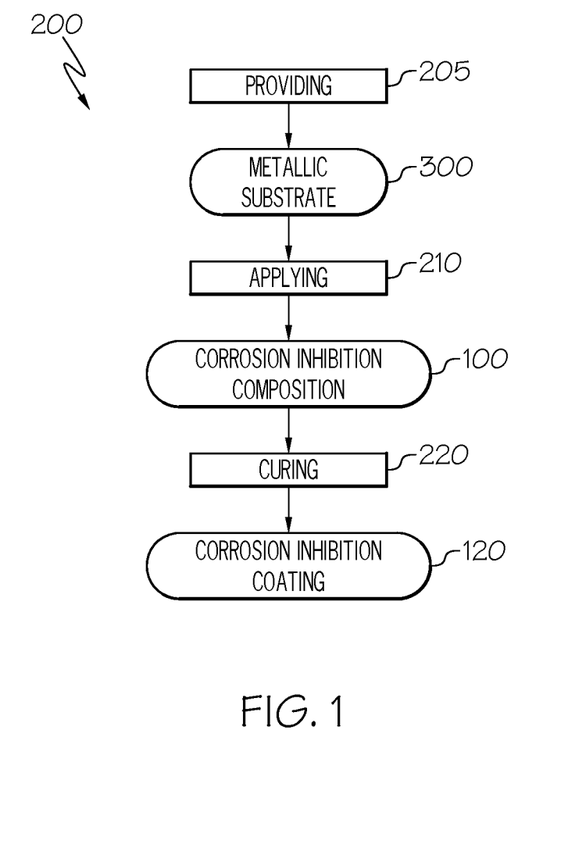
FIG. 1 is a flowchart of a method for inhibiting corrosion on a metallic substrate.

Referring to FIG. 1, in one or more examples, the disclosed corrosion inhibition composition 100 includes a carrier. The carrier may be (or may include) water, a hydrocarbon solvent, and/or a binder.

The corrosion inhibition composition 100 further includes a Schiff base in admixture with the carrier.

In one expression, the Schiff base of the disclosed corrosion inhibition composition 100 is (or includes) a thiosemicarbazone.

In another expression, the Schiff base of the disclosed corrosion inhibition composition 100 is (or includes) a member selected from the group consisting of (E)-N-methyl-2-((5-methylfuran-2-yl)methylene)hydrazine-1-carbothioamide, (E)-2-((5-methylfuran-2-yl)methylene)hydrazine-1-carbothioamide, (2E)-N-methyl-2-(3-phenylallylidene)hydrazine-1-carbothioamide, (E)-2-(4-isopropylbenzylidene)-N-methylhydrazine-1-carbothioamide, (E)-2-(4-isopropylbenzylidene)hydrazine-1-carbothioamide, (2E)-2-(3-phenylallylidene)hydrazine-1-carbothioamide, and mixtures thereof.

In another expression, the Schiff base of the disclosed corrosion inhibition composition 100 is (or includes) a member selected from the group consisting of (E)-1-(5-methylfuran-2-yl)-N-(4H-1,2,4-triazol-4-yl)methanimine, (E)-4-Hydroxy-N'-((5-methylfuran-2-yl)methylene)benzohydrazide, (E)-N'-((5-methylfuran-2-yl)methylene)benzohydrazide, (E)-2-((5-methylfuran-2-yl)methylene)hydrazine-1-carboxamide, (E)-1-phenyl-N-(4H-1,2,4-triazol-4-yl)methanimine, 4-Hydroxy-N'-[(E)-phenylmethylidene]benzohydrazide, (E)-N'-benzylidenebenzohydrazide, 4-hydroxy-N'-((1E)-3-phenylallylidene)benzohydrazide, N'-((1E)-3-phenylallylidene)benzohydrazide, (E)-1-(4-Ethylphenyl)-N-(4H-1,2,4-triazol-4-yl)methanimine, (E)-N'-(4-ethylbenzylidene)-4-hydroxybenzohydrazide, E (E)-N'-(4-ethylbenzylidene)benzohydrazide, (E)-1[-4-(propan-2-yl)phenyl]-N-(4H-1,2,4-triazol-4-yl)methanimine, 4-Hydroxy-N'-[(E)[-4-(propan-2-yl)phenyl]methylidene]benzohydrazide, N'-[(E)-[4-(propan-2-yl)phenyl]methylidene]benzohydrazide, (E)-2-(4-isopropylbenzylidene)hydrazine-1-carboxamide, (E)-1-(4-isopropylbenzylidene)urea, and mixtures thereof.

In yet another expression, the Schiff base of the corrosion inhibition composition 100 has the following structure:

The $R_2$ of the above-referenced structure is one of an alkyl, an aryl/substituted aryl, heterocyclic/substituted heterocyclic group. The R is one of a hydrogen, an aryl/substituted aryl, and an alkyl group. Further, the $R_1$ is one of a hydrogen, an aryl/substituted aryl, and an alkyl group.

The Schiff base of the corrosion inhibition composition 100 may be present in the corrosion inhibition composition 100 at a concentration of approximately 0.1 mmol to approximately 25 mmol. In one particular example, the Schiff base of the corrosion inhibition composition 100 is at a concentration of approximately 1 mmol to approximately 10 mmol.

The carrier of the corrosion inhibition composition 100 may be (or may include) a polymeric binder. In one example, the polymeric binder is (or includes) a sol gel-based polymer. The sol gel-based polymer is a film forming sol-gel based polymer such that the corrosion inhibition composition 100 includes the Schiff base in admixture with the carrier and, upon curing, forms a corrosion inhibition coating 120. In another example, the carrier is commercially available sol-gel based carrier Ultracorr ACX-W from M/s Harind Chemicals & Pharmaceuticals Pvt. Ltd., India.

Referring to FIG. 1, disclosed is a method 200 for inhibiting corrosion on a metallic substrate 300. The method 200 includes providing 205 a metallic substrate 300. The method 200 further includes applying 210 to the metallic substrate 300 a corrosion inhibition composition 100 that includes a Schiff base. The applying 210 is performed by immersing the metallic substrate 300 in the corrosion inhibition composition 100, spraying the corrosion inhibition composition 100 onto the metallic substrate 300, brushing the corrosion inhibition composition 100 onto the metallic substrate 300, dipping the corrosion inhibition composition 100, or any other suitable means.

The step of applying 210 to the metallic substrate 300 a corrosion inhibition composition 100 that includes a Schiff base may further include applying 210 to the metallic substrate 300 a corrosion inhibition composition 100 that includes a Schiff base and a carrier. The carrier may be, for example, water, a hydrocarbon solvent, and/or a binder. In one example, the binder includes a polymeric binder. In another example, the polymeric binder includes a sol gel-based polymer. The sol gel-based polymer is a film forming sol-gel based polymer such that the corrosion inhibition composition 100 includes the Schiff base in admixture with the carrier and, upon curing, forms a corrosion inhibition coating 120.

Various metallic substrates 300 may be used. For example, the metallic substrate 300 of the method 200 may be selected from the group consisting of aluminum alloy, a zinc alloy, and a nickel alloy. In one specific, non-limiting example, the metallic substrate 300 is aluminum or an aluminum alloy. In another specific, non-limiting example, the metallic substrate 300 is 2024 aluminum alloy. In yet another specific, non-limiting example, the metallic substrate 300 is a 7XXX series aluminum alloy.

Referring to FIG. 1, the method 200 may further include curing 220 the corrosion inhibition composition 100 to yield a corrosion inhibition coating 120. The curing 220 is performed by air drying, subjecting the corrosion inhibition composition 100 to thermal treatment, or any other suitable means of curing the corrosion inhibition composition 100 to yield a corrosion inhibition coating 120.

Figure 2:
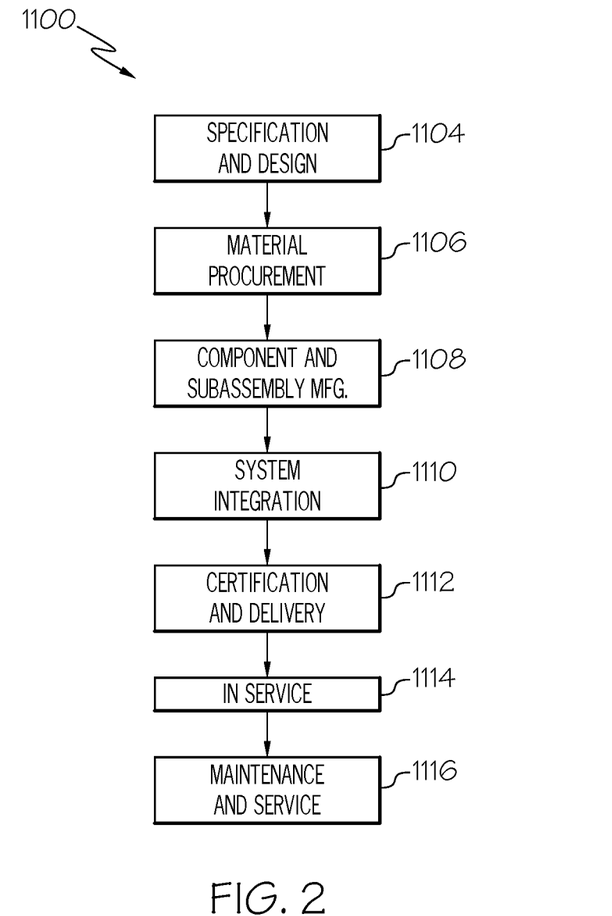
FIG. 2 is a block diagram of aircraft production and service methodology.
Figure 3:
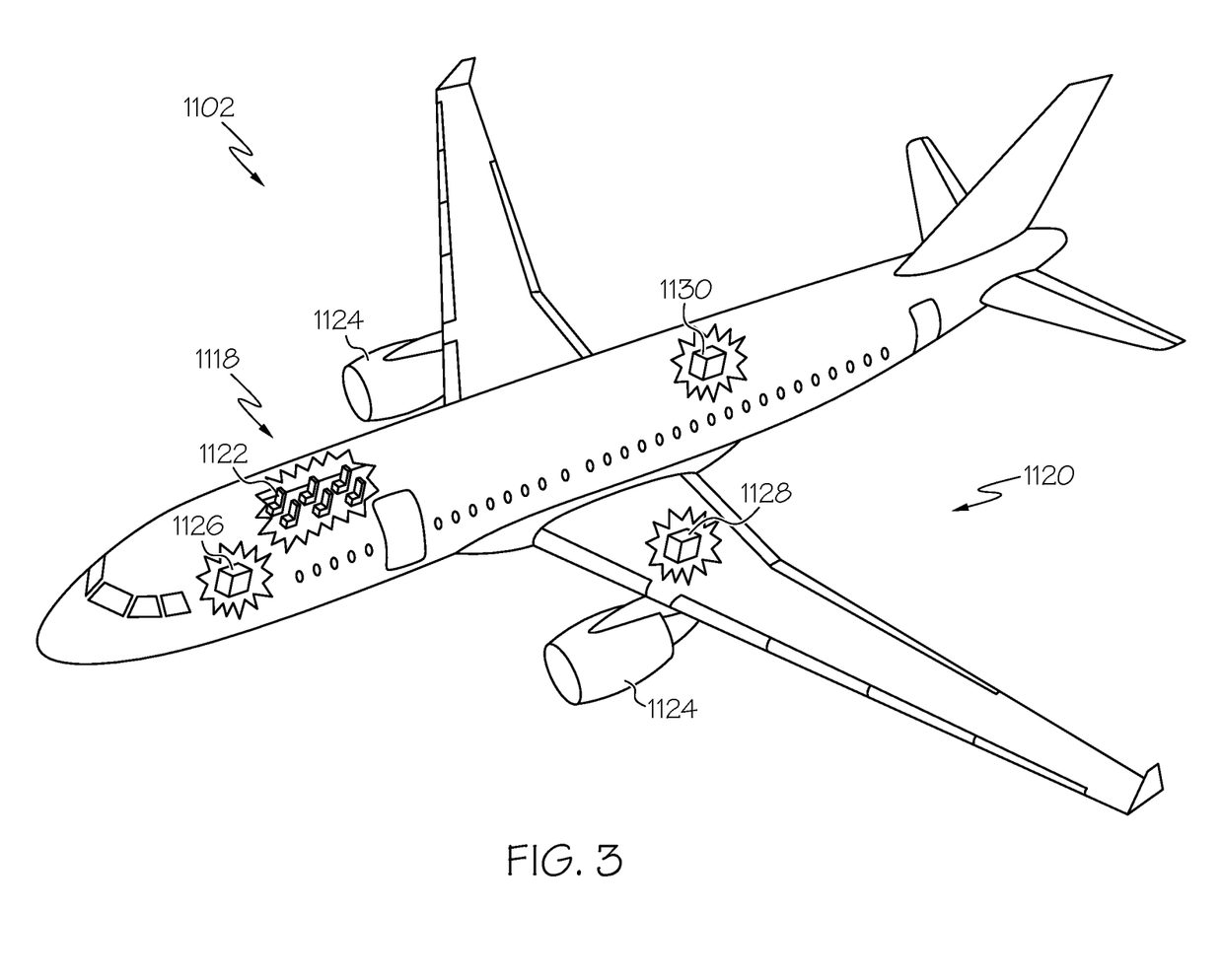
FIG. 3 is a schematic illustration of an aircraft.

Examples of the subject matter disclosed herein may be described in the context of aircraft manufacturing and service method 1100 as shown in FIG. 2 and aircraft 1102 as shown in FIG. 3. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 3, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages (block 1108 and block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method (s) disclosed herein include a variety of components, features, and functionalities. It should be understood that the various examples of the apparatus(es) and method (s), disclosed herein, may include any of the components, features, and functionalities of any of the other examples of the apparatus(es) and method (s) disclosed herein in any combination.

Many modifications of examples, set forth herein, will come to mind of one skilled in the art, having the benefit of the teachings, presented in the foregoing descriptions and the associated drawings. Therefore, it is to be understood that the subject matter disclosed herein is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims.

Examples

Examples of the disclosed corrosion inhibition composition 100 and method 200 of inhibiting corrosion on metallic substrates are provided herein. The metallic substrate 300 used in the following examples is Al 2024. The carrier used in the following examples is a sol-gel based polymeric binder.

For synthesis of the Schiff base inhibitor, equimolar mixtures of aldehyde and primary amine were taken in a round bottomed flask, dissolved in ethanol, and a few drops of glacial Acetic acid were added to the mixture. The reaction mixture was refluxed for 2-3 hrs. The completion of reaction was monitored by TLC (mobile phase used is Ethyl acetate: Pet Ether at 5:1 ratio). After completion of reaction, the reaction mixture was cooled to room temperature and remaining solvent evaporated. Precipitate was obtained after solvent evaporation was filtered, washed with cold water, and dried. The compound was recrystallized from absolute ethanol. Recrystallized compound was characterized using Fourier-transform infrared spectroscopy (FTIR), Nuclear magnetic resonance spectroscopy (NMR) for structure confirmation.

Electrochemical analysis was used to measure corrosion inhibition efficiency of synthesized the corrosion inhibition compositions 100 having a Schiff base on the Al 2024 alloys. The corrosion inhibition compositions 100 were utilized in a 5% NaCl solution to test inhibition properties when exposed to a corrosive environment. After the corrosion inhibition compositions 100 were cured, they were tested with electrochemical analysis.

Table 1 illustrates the Schiff base inhibitors used in the examples disclosed herein.

TABLE 1

| Sr No. | Inhibitor | IUPAC Name | Structure | Molecular Formula | Molecular weight |
|---|---|---|---|---|---|
| 1 | 5MF-4ATri | (E)-1-(5-methylfuran-2-yl)-N-(4H-1,2,4-triazol-4-yl)methanimine | | C8H8N4O | 176.18 |
| 2 | 5MF-4HBH | (E)-4-hydroxy-N'-((5-methylfuran-2-yl)methylene)benzohydrazide | | C13H12N2O3 | 244.25 |
| 3 | 5MF-4M3TSC | (E)-N-methyl-2-((5-methylfuran-2-yl)methylene)hydrazine-1-carbothioamide | | C8H11N3OS | 197.26 |
| 4 | 5MF-BH | (E)-N'-((5-methylfuran-2-yl)methylene)benzohydrazide | | C13H12N2O2 | 228.25 |
| 5 | 5MF-SC | (E)-2-((5-methylfuran-2-yl)methylene)hydrazine-1-carboxamide | | C7H9N3O2 | 167.17 |
| 6 | 5MF-TSC | (E)-2-((5-methylfuran-2-yl)methylene)hydrazine-1-carbothioamide | | C7H9N3OS | 183.23 |
| 7 | B-4ATri | (E)-1-phenyl-N-(4H-1,2,4-triazol-4-yl)methanimine | | C9H8N4 | 172.19 |

TABLE 1-continued

| Sr No. | Inhibitor | IUPAC Name | Structure | Molecular Formula | Molecular weight |
|---|---|---|---|---|---|
| 8 | B-4HBH | 4-Hydroxy-N'-[(E)-phenylmethylidene]benzohydrazide | | C14H12N2O2 | 240.26 |
| 9 | B-BH | (E)-N'-benzylidenebenzohydrazide | | C14H12N2O | 224.26 |
| 10 | C-4HBH | 4-hydroxy-N'-((1E)-3-phenylallylidene)benzohydrazide | | C16H14N2O2 | 266.30 |
| 11 | C-4M3TSC | (2E)-N-methyl-2-(3-phenylallylidene)hydrazine-1-carbothioamide | | C11H13N3S | 219.31 |
| 12 | C-BH | N'-((1E)-3-phenylallylidene)benzohydrazide | | C16H14N2O | 250.30 |
| 13 | C-TSC | (2E)-2-(3-phenylallylidene)hydrazine-1-carbothioamide | | C10H11N3S | 205.28 |
| 14 | EB-4ATri | (E)-1-(4-Ethylphenyl)-N-(4H-1,2,4-triazol-4-yl)methanimine | | C11H12N4 | 200.25 |
| 15 | EB-4HBH | (E)-N'-(4-ethylbenzylidene)-4-hydroxybenzohydrazide | | C16H16N2O2 | 268.32 |

TABLE 1-continued

| Sr No. | Inhibitor | IUPAC Name | Structure | Molecular Formula | Molecular weight |
|---|---|---|---|---|---|
| 16 | EB-BH | E (E)-N'-(4-ethylbenzylidene)benzohydrazide | | C16H16N2O | 252.32 |
| 17 | IPB-4ATri | (E)-1-[4-(propan-2-yl)phenyl]-N-(4H-1,2,4-triazol-4-yl)methanimine | | C12H14N4 | 214.27 |
| 18 | IPB-4HBH | 4-Hydroxy-N'-[(E)-[4-(propan-2-yl)phenyl]methylidene]benzohydrazide | | C17H18N2O2 | 282.34 |
| 19 | IPB-4M3TSC | (E)-2-(4-isopropylbenzylidene)-N-methylhydrazine-1-carbothioamide | | C12H17N3S | 235.35 |
| 20 | IPB-BH | N'-[(E)-[4-(propan-2-yl)phenyl]methylidene]benzohydrazide | | C17H18N2O | 266.34 |
| 21 | IPB-SC | (E)-2-(4-isopropylbenzylidene)hydrazine-1-carboxamide | | C11H15N3O | 205.26 |
| 22 | IPB-TSC | (E)-2-(4-isopropylbenzylidene)hydrazine-1-carbothioamide | | C11H15N3S | 221.32 |
| 23 | IPBU | (E)-1-(4-isopropylbenzylidene)urea | | C11H14N2O | 190.25 |

Table 2 illustrates the aldehydes and primary amines used for synthesis of Schiff base inhibitors in the examples disclosed herein.

TABLE 2

| Aldehyde | Primary Amine |
|---|---|
| Benzaldehyde (B) | 4-Amino triazole (4ATri) |
| 4-Isopropylbenzaldehyde (IPB) | Benzohydrazide (BH) |
| 5-Methyl Furfural (5MF) | 4-Hydroxyl benzohydrazide (4HBH) |
| Cinnamaldehyde (C) | Urea (U) |
| 4-Ethylbenzaldehyde (EB) | Thiosemicarbazide (TSC) |
| | 4-Methyl-3 Thiosemicarbazide (4M3TSC) |
| | Semicarbazide (SC) |

Corrosion inhibition efficiency of synthesized Schiff base inhibitors was measured using electrochemical method of analysis. Linear polarization resistance (LPR) of Al 2024 measured in 5% NaCl and inhibitor solution mixture as electrolyte.

The technique involved monitoring the current response when a small potential typically of the order of ±10 mV, relative to its Open Circuit Potential (OCP) is applied to the working electrode (Al 2024 in this case). As the potential of the material (working electrode) is changed, a current will be induced to flow between the working and counter electrodes, and the material's resistance to polarization can be found by taking the slope of the potential versus current curve. This polarization resistance is proportional to the corrosion rate. As inhibitors bind to the surface of Al 2024 and passivates the surface, the calculated polarization resistance of the Al 2024 panel is expected to increase. Inhibition efficiency for inhibitor is calculated using following equation:

$$\% \text{ Inhibition Efficiency} = \frac{Rp_{inh} - Rp_0}{Rp_{inh}} \times 100$$

In the above-referenced calculation, $R_{pinh}$ and $R_{p0}$ represent LPR with and without inhibitor, respectively.

LPR measurements were carried out using CH Instrument's electrochemical workstation model CHI 600E. The electrochemical cell consists of three electrode flat cell with platinum as counter electrode, saturated calomel electrode (SCE) as reference electrode and Al 2024 as working electrode. Pre-cleaned Al 2024 panels were exposed to electrolyte solution for different increments of time. Experimental parameters began with panel preparation, as detailed below.

Panel preparation included: 1) an acetone wipe to degrease panels; 2) dip in 10% NaOH solution for 4 min; 3) rinse in DI water (2 time); 4) dip in 50% HNO3 for 1 min; 5) rinse in DI water (2 time); and 6) air dry the panels.

Electrolyte preparation included: 1) preparation of phosphate buffer saline (PBS) solution (pH 7.4); 2) preparation of 5% NaCl Solution in PBS solution; 3) adding 300 ml of 5% NaCl solution prepared in PBS solution to a beaker and add 0.5 gm of inhibitor; 4) subject to a bath-sonicator for 15 min; 5) filtration through Whatmann filter paper no.1; and 6) using the filtrate as electrolyte.

A potentiostat was used for electroanalytical data collection. Experimental parameters include: 1) measuring open circuit potential (OCP) for 15 min; 2) running potential sweep at ±10 mV of OCP with scan rate of 0.1667 mV/S; 3) calculating linear polarization resistance LPR within a range of ±10 mV of OCP; 4) measuring LPR after 1 hr, 3 hr and 5 hrs of exposure by following step 1-3; 5) plotting Rp vs time for each inhibitor; and 6) calculating corrosion efficiency for inhibitor with LPR measured post 5 hours of exposure.

Table 3 illustrates the percent of corrosion inhibition efficiency for each corrosion inhibitor tested on an Al 2024 metallic substrate 300.

TABLE 3

| Sr no. | Inhibitor | LPR after 5 hrs exposure (K Ohm) | % Corrosion Inhibition Efficiency |
|---|---|---|---|
| 1 | Blank | 7.31 | |
| 2 | Dichromate | 217.2 | 96.6 |
| 3 | 5MF-4ATri | 19.58 | 62.7 |
| 4 | 5MF-4HBH | 19.12 | 61.8 |
| 5 | 5MF-4M3TSC | 107.9 | 93.2 |
| 6 | 5MF-BH | 10.45 | 30.0 |
| 7 | 5MF-SC | 14.23 | 48.6 |
| 8 | 5MF-TSC | 340.7 | 97.9 |
| 9 | B-4ATri | 27.01 | 72.9 |
| 10 | B-4HBH | 34.01 | 78.5 |
| 12 | C-4HBH | 15.94 | 54.1 |
| 13 | C-4M3TSC | 237.5 | 96.9 |
| 14 | C-BH | 16.97 | 56.9 |
| 15 | C-TSC | 71.34 | 89.8 |
| 16 | EB-4ATri | 17.38 | 57.9 |

TABLE 3-continued

| Sr no. | Inhibitor | LPR after 5 hrs exposure (K Ohm) | % Corrosion Inhibition Efficiency |
|---|---|---|---|
| 17 | EB-4HBH | 19.64 | 62.8 |
| 18 | EB-BH | 9.72 | 24.8 |
| 19 | IPB-4ATri | 18.01 | 59.4 |
| 20 | IPB-4HBH | 25.36 | 71.2 |
| 21 | IPB-4M3TSC | 247.5 | 97.0 |
| 22 | IPB-BH | 18.1 | 59.6 |
| 24 | IPB-TSC | 78.29 | 90.7 |
| 25 | IPBU | 7.39 | 1.1 |

As shown in Table 3 above, the Schiff base inhibitors synthesized using Thiosemicarbazide (Thiosemicarbazone) exhibited the highest percentage of corrosion inhibition efficiency.

Another variable tested during experimentation includes the concentration of Schiff base inhibitor dispersed into the carrier. The carrier used in the examples is commercially available sol-gel based carrier Ultracorr ACX-W from M/s Harind Chemicals & Pharmaceuticals Pvt. Ltd., India. The Thiosemicarbazones were dispersed into the sol-gel based polymer at three different concentrations as per the details mentioned in Table 4 below.

Table 4 illustrates inhibitor quantity used for preparation of different concentrations.

TABLE 4

| Sr. No | Inhibitor | Molecular Weight | 1 mM in 300 ml | 5 mM in 300 ml | 10 mM in 300 ml |
|---|---|---|---|---|---|
| 1 | 5MF-4M3TSC | 197.26 | 0.059 | 0.296 | 0.592 |
| 2 | 5MF-TSC | 183.23 | 0.055 | 0.275 | 0.550 |
| 3 | C-4M3TSC | 219.31 | 0.066 | 0.329 | 0.658 |
| 4 | C-TSC | 205.28 | 0.062 | 0.308 | 0.616 |
| 5 | IPB-4M3TSC | 235.35 | 0.071 | 0.353 | 0.706 |
| 6 | IPB-TSC | 221.32 | 0.066 | 0.332 | 0.664 |

Synthesis and application of coating done as per following steps: 1) inhibitor as per required concentration was dissolved in minimum amount of Ethanol; 2) Inhibitor solution prepared in step 1 was added to 300 ml of sol-gel based polymer under stirring. Mixture was stirred for 2 hours on magnetic stirrer at 600 RPM; 3) Above coating composition applied on pre-cleaned Al 2024 (as per process described previously) substrate using dip application. Coating cured for 7 days at RT.; and 4) Corrosion inhibition efficiency of coating was measured using electrochemical analysis (Potentiodynamic polarization). Analysis was performed in 5% salt solution prepared in PBS buffer solution. Inhibition efficiency for coating calculated using following equation:

$$\% \text{ Inhibition Efficiency} = \frac{i_{corr(uninhibited)} - i_{corr(inhibitor)}}{i_{Corr(uninhibited)}} \times 100$$

The coating compositions were evaluated by potentiodynamic polarization. Results shown in Table 5 below indicate a decrease in corrosion current density (I) and torr) corrosion rate of Al 2024 with addition of inhibitor. This in turn reveals the corrosion inhibiting nature of the coating.

TABLE 5

| Inhibitor | Inhibitor Concentration (mM) | $E_{corr}$ (V) | $I_{Corr}$ (A) | Corrosion Rate (mil/year) | % Corrosion Inhibition Efficiency |
|---|---|---|---|---|---|
| 5MF-4M3TSC | 0 | −0.686 | 10.61 × 10⁻⁹ | 4.421 × 10⁻³ | |
| | 1 | −0.667 | 10.38 × 10⁻⁹ | 4.323 × 10⁻³ | 2.17 |
| | 5 | −0.685 | 9.780 × 10⁻⁹ | 4.074 × 10⁻³ | 7.82 |
| | 10 | −0.61 | 8.451 × 10⁻⁹ | 3.521 × 10⁻³ | 20.35 |
| 5MF-TSC | 0 | −0.702 | 17.72 × 10⁻⁹ | 7.384 × 10⁻³ | |
| | 1 | −0.654 | 8.778 × 10⁻⁹ | 3.657 × 10⁻³ | 50.5 |
| | 5 | −0.575 | 10.04 × 10⁻⁹ | 4.184 × 10⁻³ | 43.3 |
| | 10 | −0.608 | 7.407 × 10⁻⁹ | 3.086 × 10⁻³ | 58.2 |
| IPB-4M3TSC | 0 | −0.68 | 34.74 × 10⁻⁹ | 14.47 × 10⁻³ | |
| | 1 | −0.612 | 16.31 × 10⁻⁹ | 6.797 × 10⁻³ | 53.1 |
| | 5 | −0.548 | 7.078 × 10⁻⁹ | 2.949 × 10⁻³ | 79.6 |
| | 10 | −0.615 | 5.601 × 10⁻⁹ | 2.333 × 10⁻³ | 83.9 |
| IPB-TSC | 0 | −0.652 | 42.82 × 10⁻⁹ | 17.84 × 10⁻³ | |
| | 1 | −0.379 | 11.19 × 10⁻⁹ | 4.662 × 10⁻³ | 67.8 |
| | 5 | −0.414 | 10.26 × 10⁻⁹ | 4.274 × 10⁻³ | 70.5 |
| | 10 | −0.466 | 8.769 × 10⁻⁹ | 3.653 × 10⁻³ | 74.8 |
| C-4M3TSC | 0 | −0.593 | 22.27 × 10⁻⁹ | 9.279 × 10⁻³ | |
| | 1 | −0.621 | 17.48 × 10⁻⁹ | 7.283 × 10⁻³ | 7.3 |
| | 5 | −0.653 | 17.07 × 10⁻⁹ | 7.112 × 10⁻³ | 9.4 |
| | 10 | −0.549 | 14.14 × 10⁻⁹ | 5.892 × 10⁻³ | 25.0 |
| C-TSC | 0 | −0.643 | 78.80 × 10⁻⁹ | 32.83 × 10⁻³ | |
| | 1 | −0.623 | 12.97 × 10⁻⁹ | 5.402 × 10⁻³ | 83.5 |
| | 5 | −0.631 | 18.89 × 10⁻⁹ | 7.870 × 10⁻³ | 76.0 |
| | 10 | −0.601 | 11.56 × 10⁻⁹ | 4.814 × 10⁻³ | 85.3 |

What is claimed is:

1. A corrosion inhibition composition comprising:
   a carrier, the carrier comprising a sol gel-based polymer; and
   a Schiff base in admixture with the carrier,
   wherein the Schiff base comprises a thiosemicarbazone, or
   wherein the Schiff base comprises the following structure:

wherein the R₂ is one of an alkyl, an aryl/substituted aryl, and a heterocyclic/substituted heterocyclic group, wherein the R is one of a hydrogen, an aryl/substituted aryl, and an alkyl group, and wherein the R₁ is one of a hydrogen, an aryl/substituted aryl, and an alkyl group.

2. The corrosion inhibition composition of claim 1, wherein the Schiff base is at a concentration of approximately 0.1 mmol to approximately 25 mmol.

3. The corrosion inhibition composition of claim 1, wherein the Schiff base comprises a thiosemicarbazone.

4. The corrosion inhibition composition of claim 1, wherein the Schiff base comprises the following structure:

wherein the R₂ is one of an alkyl, an aryl/substituted aryl, and a heterocyclic/substituted heterocyclic group, wherein the R is one of a hydrogen, an aryl/substituted aryl, and an alkyl group, and wherein the R₁ is one of a hydrogen, an aryl/substituted aryl, and an alkyl group.

5. The corrosion inhibition composition comprising:
a carrier; and
a Schiff base in admixture with the carrier, the carrier comprising at least one of water, a hydrocarbon solvent, and a binder,
wherein the Schiff base is selected from the group consisting of (E)-N-methyl-2-(5-methylfuran-2-yl)methylene)hydrazine-1-carbothioamide, (E)-2-((5-methylfuran-2-yl)methylene)hydrazine-1-carbothioamide, (2E)-N-methyl-2-(3-phenylallylidene)hydrazine-1-carbothioamide, (E)-2-(4-isopropylbenzylidene)-N-methylhydrazine-1-carbothioamide, (E)-2-(4-isopropylbenzylidene)hydrazine-1-carbothioamide, (2E)-2-(3-phenylallylidene)hydrazine-1-carbothioamide, and mixtures thereof, or
wherein the Schiff base is selected from the group consisting of(E)-1-(5-methylfuran-2-yl)-N-(4H-1,2,4-triazol-4-yl)methanimine, (E)-4-Hydroxy-N'-((5-methylfuran-2-yl)methylene)benzohydrazide, (E)-N'-((5-methylfuran-2-yl)methylene)benzohydrazide, (E)-2-((5-methylfuran-2-yl)methylene)hydrazine-1-carboxamide, (E)-1-phenyl-N-(4H-1,2,4-triazol-4-yl)methanimine, 4-Hydroxy-N'-[(E)-phenylmethylidene]benzohydrazide, (E)-N'-benzylidenebenzohydrazide, 4-hydroxy-N'-((1E)-3-phenylallylidene)benzohydrazide, N'-((1E)-3-phenylallylidene)benzohydrazide, (E)-1-(4-Ethylphenyl)-N-(4H-1,2,4-triazol-4-yl)methanimine, (E)-N'-(4-ethylbenzylidene)-4-hydroxybenzohydrazide, E (E)-N'-(4-ethylbenzylidene)benzohydrazide, (E)-1-[4-(propan-2-yl)phenyl]-N-(4H-1,2,4-triazol-4-yl)methanimine, 4-Hydroxy-N'-[(E)-[4-(propan-2-yl)phenyl]methylidene]benzohydrazide, N'-[(E)-[4-(propan-2-yl)phenyl]methylidene]benzohydrazide, (E)-2-(4-isopropylbenzylidene)hydrazine-1-carboxamide, (E)-1-(4-isopropylbenzylidene)urea, and mixtures thereof.

6. The corrosion inhibition composition of claim 5, wherein the Schiff base is selected from the group consisting of (E)-N-methyl-2-((5-methylfuran-2-yl)methylene)hydrazine-1-carbothioamide, (E)-2-((5-methylfuran-2-yl)methylene)hydrazine-1-carbothioamide, (2E)-N-methyl-2-(3-phenylallylidene)hydrazine-1-carbothioamide, (E)-2-(4-isopropylbenzylidene)-N-methylhydrazine-1-carbothioamide, (E)-2-(4-isopropylbenzylidene)hydrazine-1-carbothioamide, (2E)-2-(3-phenylallylidene)hydrazine-1-carbothioamide, and mixtures thereof.

7. The corrosion inhibition composition of claim 5, wherein the Schiff base is selected from the group consisting of (E)-1-(5-methylfuran-2-yl)-N-(4H-1,2,4-triazol-4-yl)methanimine, (E)-4-Hydroxy-N'-((5-methylfuran-2-yl)methylene)benzohydrazide, (E)-N'-((5-methylfuran-2-yl)methylene)benzohydrazide, (E)-2-((5-methylfuran-2-yl)methylene)hydrazine-1-carboxamide, (E)-1-phenyl-N-(4H-1,2,4-triazol-4-yl)methanimine, 4-Hydroxy-N'-[(E)-phenylmethylidene]benzohydrazide, (E)-N'-benzylidenebenzohydrazide, 4-hydroxy-N'-((1E)-3-phenylallylidene)benzohydrazide, N'-((1E)-3-phenylallylidene)benzohydrazide, (E)-1-(4-Ethylphenyl)-N-(4H-1,2,4-triazol-4-yl)methanimine, (E)-N'-(4-ethylbenzylidene)-4-hydroxybenzohydrazide, E (E)-N'-(4-ethylbenzylidene)benzohydrazide, (E)-1-[4-(propan-2-yl)phenyl]-N-(4H-1,2,4-triazol-4-yl)methanimine, 4-Hydroxy-N'-[(E)-[4-(propan-2-yl)phenyl]methylidene]benzohydrazide, N'-[(E)-[4-(propan-2-yl)phenyl]methylidene]benzohydrazide, (E)-2-(4-isopropylbenzylidene)hydrazine-1-carboxamide, (E)-1-(4-isopropylbenzylidene)urea, and mixtures thereof.

8. A method for inhibiting corrosion on a metallic substrate, the method comprising:
applying to the metallic substrate a corrosion inhibition composition comprising a Schiff base,
wherein the corrosion inhibition composition further comprises a carrier, wherein the carrier comprises a polymeric binder, wherein the polymeric binder comprises a sol gel-based polymer.

9. The method of claim 8, wherein the Schiff base comprises a thiosemicarbazone.

10. The method of claim 8, wherein the Schiff base is selected from the group consisting of (E)-N-methyl-2-(5-methylfuran-2-yl)methylene)hydrazine-1-carbothioamide, (E)-2-((5-methylfuran-2-yl)methylene)hydrazine-1-carbothioamide, (2E)-N-methyl-2-(3-phenylallylidene)hydrazine-1-carbothioamide, (E)-2-(4-isopropylbenzylidene)-N-methylhydrazine-1-carbothioamide, (E)-2-(4-isopropylbenzylidene)hydrazine-1-carbothioamide, (2E)-2-(3-phenylallylidene)hydrazine-1-carbothioamide, and mixtures thereof.

11. The method of claim 8, wherein the Schiff base is selected from the group consisting of (E)-1-(5-methylfuran-2-yl)-N-(4H-1,2,4-triazol-4-yl)methanimine, (E)-4-Hydroxy-N'-((5-methylfuran-2-yl)methylene)benzohydrazide, (E)-N'-((5-methylfuran-2-yl)methylene)benzohydrazide, (E)-2-((5-methylfuran-2-yl)methylene)hydrazine-1-carboxamide, (E)-1-phenyl-N-(4H-1,2,4-triazol-4-yl)methanimine, 4-Hydroxy-N'-[(E)-phenylmethylidene]benzohydrazide, (E)-N'-benzylidenebenzohydrazide, 4-hydroxy-N'-((1E)-3-phenylallylidene)benzohydrazide, N'-((1E)-3-phenylallylidene)benzohydrazide, (E)-1-(4-Ethylphenyl)-N-(4H-1,2,4-triazol-4-yl)methanimine, (E)-N'-(4-ethylbenzylidene)-4-hydroxybenzohydrazide, E (E)-N'-(4-ethylbenzylidene)benzohydrazide, (E)-1-[4-(propan-2-yl)phenyl]-N-(4H-1,2,4-triazol-4-yl)methanimine, 4-Hydroxy-N'-[(E)-[4-(propan-2-yl)phenyl]methylidene]benzohydrazide, N'-[(E)-[4-(propan-2-yl)phenyl]methylidene]benzohydrazide, (E)-2-(4-isopropylbenzylidene)hydrazine-1-carboxamide, (E)-1-(4-isopropylbenzylidene)urea, and mixtures thereof.

12. The method of claim 8, wherein the Schiff base comprises the following structure:

wherein the $R_2$ is one of an alkyl, an aryl/substituted aryl, and a heterocyclic/substituted heterocyclic group, wherein the R is one of a hydrogen, an aryl/substituted aryl, and an alkyl group, and wherein the $R_1$ is one of a hydrogen, an aryl/substituted aryl, and an alkyl group.

13. The method of claim 8, wherein the metallic substrate comprises 2024 aluminum alloy.

14. The method of claim 8, wherein the metallic substrate comprises aluminum alloy.

15. The method of claim 8, further comprising curing the applied corrosion inhibition composition.

16. A coated metallic substrate, comprising:
a metallic substrate; and
a coating comprising the corrosion inhibition composition of claim 1.

17. A coated metallic substrate, comprising:
a metallic substrate; and
a coating comprising the corrosion inhibition composition of claim 3.

18. A method for inhibiting corrosion on a metallic substrate, the method comprising applying to the metallic substrate the corrosion inhibition composition of claim 5.

19. A coated metallic substrate formed by the method of claim 15.

20. A method for inhibiting corrosion on a metallic substrate, the method comprising:
applying to the metallic substrate a corrosion inhibition composition comprising a Schiff base,
wherein the corrosion inhibition composition further comprises a carrier, wherein the carrier comprises a polymeric binder, and wherein:
(a) the Schiff base comprises a thiosemicarbazone;
(b) the Schiff base is selected from the group consisting of (E)-N-methyl-2-((5-methylfuran-2-yl)methylene)hydrazine-1-carbothioamide, (E)-2-((5-methylfuran-2-yl)methylene)hydrazine-1-carbothioamide, (2E)-N-methyl-2-(3-phenylallylidene)hydrazine-1-carbothioamide, (E)-2-(4-isopropylbenzylidene)-N-methylhydrazine-1-carbothioamide, (E)-2-4-isopropylbenzylidene)hydrazine-1-carbothioamide, (2E)-2-(3-phenylallylidene)hydrazine-1-carbothioamide, and mixtures thereof;
(c) the Schiff base is selected from the group consisting of (E)-1-(5-methylfuran-2-yl)-N-(4H-1,2,4-triazol-4-yl)methanimine, (E)-4-Hydroxy-N'-((5-methylfuran-2-yl)methylene)benzohydrazide, (E)-N'-((5-methylfuran-2-yl)methylene)benzohydrazide, (E)-2-((5-methylfuran-2-yl)methylene)hydrazine-1-carboxamide, (E)-1-phenyl-N-(4H-1,2,4-triazol-4-yl)methanimine, 4-Hydroxy-N'-[(E)-phenylmethylidene]benzohydrazide, (E)-N'-benzylidenebenzohydrazide, 4-hydroxy-N'-((1E)-3-phenylallylidene)benzohydrazide, N'-((1E)-3-phenylallylidene)benzohydrazide, (E)-1-(4-Ethylphenyl)-N-(4H-1,2,4-triazol-4-yl)methanimine, (E)-N'-(4-ethylbenzylidene)-4-hydroxybenzohydrazide, E (E)-N'-(4-ethylbenzylidene)benzohydrazide, (E)-1-[4-(propan-2-yl)phenyl]-N-(4H-1,2,4-triazol-4-yl)methanimine, 4-Hydroxy-N'-[(E)-[4-(propan-2-yl)phenyl]methylidene]benzohydrazide, N'-[(E)-[4-(propan-2-yl)phenyl]methylidene]benzohydrazide, (E)-2-(4-isopropylbenzylidene)hydrazine-1-carboxamide, (E)-1-(4-isopropylbenzylidene)urea, and mixtures thereof; or
(d) the Schiff base comprises the following structure:

wherein the $R_2$ is one of an alkyl, an aryl/substituted aryl, and a heterocyclic/substituted heterocyclic group, wherein the R is one of a hydrogen, an aryl/substituted aryl, and an alkyl group, and wherein the $R_1$ is one of a hydrogen, an aryl/substituted aryl, and an alkyl group.

* * * * *